(12) United States Patent
Bayer

(10) Patent No.: US 7,827,560 B2
(45) Date of Patent: Nov. 2, 2010

(54) SYSTEM AND METHOD FOR TIME CONTROLLED PROGRAM EXECUTION

(75) Inventor: Stefan Bayer, Fürth (DE)

(73) Assignee: Siemens Aktiengesellschaft (DE)

( * ) Notice: Subject to any disclaimer, the term of this patent is extended or adjusted under 35 U.S.C. 154(b) by 1312 days.

(21) Appl. No.: 11/126,628

(22) Filed: May 11, 2005

(65) Prior Publication Data

US 2006/0259908 A1    Nov. 16, 2006

(51) Int. Cl.
   *G06F 9/46* (2006.01)
(52) U.S. Cl. ........................ 718/107; 718/102
(58) Field of Classification Search .............. 718/100, 718/101, 107, 102; 705/9
   See application file for complete search history.

(56) References Cited

U.S. PATENT DOCUMENTS

| | | | | |
|---|---|---|---|---|
| 5,692,125 | A | * 11/1997 | Schloss et al. .................. | 705/9 |
| 6,047,260 | A | * 4/2000 | Levinson ........................ | 705/9 |
| 6,065,123 | A | 5/2000 | Chou | |
| 2002/0044257 | A1 | 4/2002 | Matsumoto | |

FOREIGN PATENT DOCUMENTS

DE    2005P02572    4/2010

OTHER PUBLICATIONS

English translation of the Chinese Office Action.
"Newbie: intro to Cron," by cogNiTion (cognition@attrition.org); unixgeeks.org/secuirity/newbie/unix/cron-1.html; printed on May 11, 2005; dated Dec. 30, 1999; 6 pages.
Beginners.co.uk; Outlook 2000—The Calendar Free Unrestricted Tutorial; file://C:\DOCUME~1/jkatz/LOCASL~1/Temp/2RZNU2JP.htm; printed on May 11, 2005; 5 pages.
Beginners.co.uk; Outlook 2000—The Calendar Free Unrestricted Tutorial (p. 2); file://C:\DOCUME~1/jkatz/LOCASL~1/Temp/2RZNU2JP.htm; printed on May 11, 2005; 4 pages.
Beginners.co.uk; Outlook 2000—The Calendar Free Unrestricted Tutorial (p. 3); file://C:\DOCUME~1/jkatz/LOCASL~1/Temp/2RZNU2JP.htm; printed on May 11, 2005; 5 pages.
Beginners.co.uk; Outlook 2000—The Calendar Free Unrestricted Tutorial (p. 4); file://C:\DOCUME~1/jkatz/LOCASL~1/Temp/2RZNU2JP.htm; printed on May 11, 2005; 6 pages.
iOpus—Windows Task Scheduler Tutorial With Screenshots; How to use the Windows Task Scheduler; iopus.com/guides/winscheduler.htm; printed on May 11, 2005; 6 pages.

(Continued)

*Primary Examiner*—Chat C Do
*Assistant Examiner*—Willy W Huaracha
(74) *Attorney, Agent, or Firm*—James L. Katz; Brinks Hofer Gilson & Lione

(57) ABSTRACT

A system and method is disclosed for automated task/program management which is not dependent upon a calendar based schedule and flexibly accounts for various operating conditions. In one embodiment, the disclosed system and method permits specification of one or more tasks to be performed, such as a recurring task, and a time interval. The performance/execution of the task(s) may be related to or dependent upon satisfaction of one or more conditions, for example, that the computer that will execute the task(s) is turned on or otherwise available. The system and method monitors for the elapse of the specified time interval and also that the condition(s) is/are satisfied (which may occur by default if the monitoring program is similarly dependent upon the condition(s)). Upon elapse of the time interval and satisfaction of the condition(s), the specified task(s)/program(s) is/are caused to be executed.

31 Claims, 2 Drawing Sheets

OTHER PUBLICATIONS

Online Toolworks Corporation—Windows Task Scheduler Overview; iopus.com/guides/winscheduler.htm; 6 pages.

Schedule a New Task; file://C:\Documents and Settings\jkatz\LocalSettings\Temp\~hh7034.htm; printed on May 11, 2005; 4 pages.

"Newbie: intro to Cron," by cogNiTion (cognition@attrition.org); http://www.unixqeeks.org/secuirity/newbie/unix/cron-1.html; printed on May 11, 2005; dated Dec. 30, 1999; 6 pages.

iOpus—Windows Task Scheduler Tutorial With Screenshots; How to use the Windows Task Scheduler; http://www.iopus.com/guides/winscheduler.htm; printed on May 11, 2005; 6 pages.

Online Toolworks Corporation—Windows Task Scheduler Overview; http://www.iopus.com/guides/winscheduler.htm; 6 pages.

Microsoft Windows Software Update Service Overview—Microsoft Windows Server White Paper—Microsoft Corporation Published Jun. 2002.

* cited by examiner

SYSTEM AND METHOD FOR TIME CONTROLLED PROGRAM EXECUTION

BACKGROUND

Automated execution of computer programs is desirable to perform maintenance, inventory or other routine and/or repetitive tasks on a computer system. Automating such tasks is especially advantageous in a networked environment or otherwise in a facility having a large number of workstations for which the given tasks must be performed. Often, manual execution of such tasks is resource intensive, cumbersome and unreliable.

One method of executing computer programs automatically is to use a scheduling computer program, such as the Windows Task Scheduler program provided by Microsoft Windows XP computer operating system, published by Microsoft Corporation, located in Redmond, Wash. On a given workstation, the Windows Task Scheduler permits a user to schedule the automated execution of a program according to a calendar based execution schedule, including configuring recurring execution of the particular program according to a calendar based pattern. On UNIX based workstations, users may utilize the CRON functionality to automate task/program execution. Further, other programs provide calendar based scheduling of tasks. For example, Microsoft Outlook, published by Microsoft Corporation, located in Redmond, Wash., permits a user to schedule reminders which display in a reminder window, or otherwise activate an alert, on the computer display screen at the appointed time. Outlook checks for pending reminders, i.e. reminders that would have been displayed had outlook been running, each time it is started. Accordingly, if the computer is turned off at the appointed time, Outlook will display any pending reminders the next time Outlook is executed.

One problem with these methods for scheduling is that they are calendar based. Accordingly, they utilize absolute references when specifying a schedule, including specification of recurrence patterns. Calendar based scheduling may work well for informational purposes, such as displaying alerts or reminders, but, if used to control program or task execution, such scheduling may result in anomalous execution under certain circumstances, such as when the computer is turned off, busy or otherwise unavailable to execute the scheduled task. For example, if the task is scheduled to execute every Tuesday and the computer is turned off for 3 weeks, if the computer is next powered up on a Wednesday, the prior automation program may execute the three missed executions immediately, similar to the way Microsoft Outlook handles pending reminders, which may be unacceptable depending upon the impact on the system load or other resources. Alternatively, the automation program may not execute the task at all until the next Tuesday comes around, thereby incurring additional, and perhaps unacceptable, delay in executing the task.

Accordingly, there is a need for a system and method of automated task/program execution management that is not reliant on absolute references for scheduling the execution of programs and flexibly handles potential operating conditions.

DETAILED DESCRIPTION OF THE DRAWINGS AND PRESENTLY PREFERRED EMBODIMENTS

The disclosed embodiments relate to a system and method for automated task/program management which is not dependent upon a calendar based schedule and flexibly accounts for various operating conditions. In one embodiment, the disclosed system and method permits specification of one or more tasks to be performed, such as a recurring task, and a time interval. The performance/execution of the task(s) may be related to or dependent upon satisfaction of one or more conditions, for example, that the computer that will execute the task is turned on or otherwise available. The system and method monitors for the elapse of the specified time interval and also that the condition is satisfied (which may occur by default or otherwise occur inherently if the monitoring program is similarly dependent upon the condition). Upon elapse of the time interval and satisfaction of the condition, the specified task(s)/program(s) is/are caused to be executed. In this way, for example, if the computer that is to execute a recurring task is unavailable, multiple missed executions of the given task will not be stored up and then immediately executed when the computer becomes available and execution of the task will not be delayed due to the timing of the computer's availability with respect to a recurrence schedule.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superceding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 2:
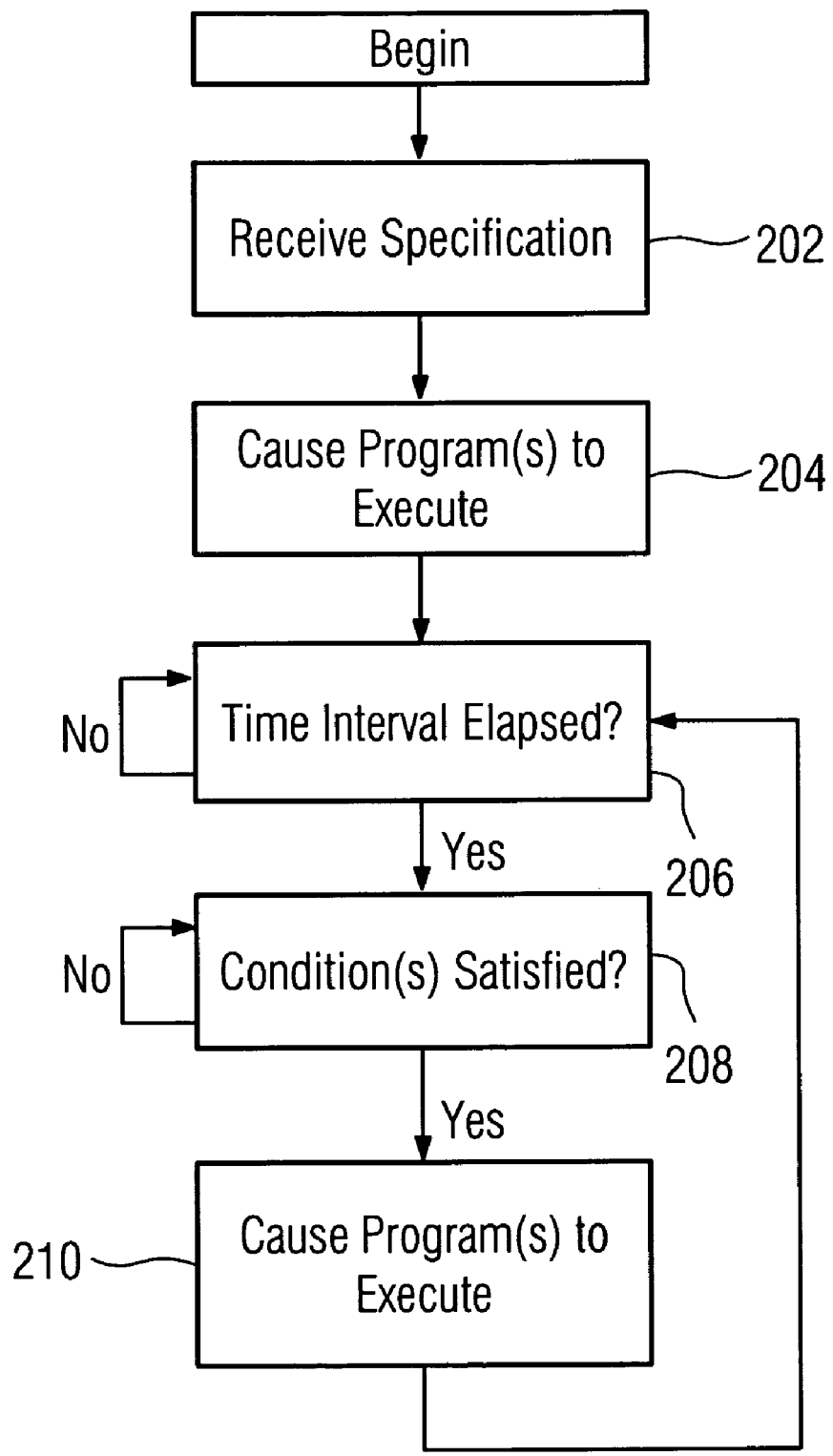
FIG. 2 depicts a flow chart showing the operation of the system of FIG. 1 according to one embodiment.

FIG. 2 depicts a flow chart showing operation of the disclosed system, according to one embodiment, for causing execution of one or more computer programs on a computer. The computer program(s) to be executed may include, for example, an asset management program or may include any computer program, including maintenance or update programs, scheduling programs, application programs, etc. Further, the disclosed embodiments may be utilized to cause execution of multiple different programs on one or more computers and/or the same program on different computers, as will be discussed, and with different recurrence patterns and conditions. In one embodiment, the disclosed system and method may be executed on the same computer which will execute the desired program/task or, in an alternate embodiment, the disclosed system and method may be executed on a computer that is remote from the computer(s) which will execute the particular task/program, the computers being coupled with each other via a network, such as the Internet, an intranet, a wired or wireless network, or combinations thereof. In still another alternative embodiment, the disclosed system and method may be implemented among a combination of remote and local components. For example, a remotely located scheduling system, according to the disclosed embodiments, may be used to cause execution of locally located scheduling system, also according to the disclosed embodiments, which causes execution of another task/program, as described, on a local or yet another remote computer.

In operation, a specification of a time interval and the program to be executed is received (block 202). The specification may be received from a user via a user interface coupled with the disclosed system, such as a graphical or text based user interface. In one embodiment, the specification may be received from a remote computer, via a network, by a program running local to the computer which will execute the specified program(s), the remote computer having received the specification from a user. The time interval represents the minimum amount of time that must elapse between executing recurring incidents of the specified program(s) on the computer. This ensures that multiple missed executions are not executed all at once when the computer becomes available. In one embodiment, the time interval may be dynamic and change with each incident of the program(s) execution or based on some other event, such as by increasing, decreasing or randomly changing, such as for security purposes. For example where the program to be executed is a maintenance program, the time interval may be dynamically adjusted to change the execution frequency when the computer is routinely subjected to a heavy workload, either to avoid interfering with the workload (less frequent execution) or to ensure that the system receives sufficient maintenance (more frequent execution) depending upon the implementation. In another example, the program to be executed may be related to a security application and therefore a randomized interval may be used so that unauthorized entities cannot determine when the program will execute.

As discussed above, the execution of the program is related to satisfaction of one or more conditions which are unrelated to the time interval. In one embodiment, the execution of the program(s) may be dependent upon the condition being satisfied. In one embodiment, the specification may further specify the condition(s). Alternatively, satisfaction of the condition(s) may be inherent in the execution of the program(s). Exemplary conditions include that the computer that is to execute the program is turned on, operational or otherwise available. It will be appreciated that if the computer which is executing the disclosed system is the same computer that is to execute the specified program(s), a condition which is dependent on the operational status of the computer may be determined to be satisfied inherently by the fact that the disclosed system is itself operating. Other conditions may include that the computer is not busy, not needed or its workload is below a particular threshold. Conditions may also include the occurrence of one or more events or conditions at least indirectly related to the specified time interval. In addition, the specified condition(s) may be dynamic and change, either the condition(s) itself or the factors which satisfy the condition(s), with each incident of the program(s) execution or based on some other event. In some embodiments, conditions which are expected to rarely or never be satisfied may be utilized.

Once the specification has been received, a first incident of the program(s) is/are executed (block 204). In one embodiment, where the disclosed system is operating remotely from the computer upon which execution is to occur, the remote system may transmit one or more commands to the computer via the network to cause the execution. The computer may then respond to confirm that the command(s) has/have been received and/or the program(s) is/are executing or has been executed, depending upon the implementation.

In one embodiment, the program(s) is/are caused to be executed immediately upon receipt of the specification. In an alternative embodiment, the program(s) is/are caused to be executed upon elapse of the time interval from the time of receipt of the specification or from some other specified base time, and when the condition(s) is/are satisfied, as will be discussed in more detail below.

Once the program(s) has/have been caused to execute, the system monitors the elapse of time since the program(s) was/were executed and compares this elapse of time with the specified time interval (block 206). In one embodiment, the monitoring begins after the program(s) finishes executing. In an alternate embodiment, the monitoring begins after the program(s) has/have been caused to execute. In yet another alternative embodiment, if during the monitoring of the elapse of time, and before the elapsed time meets or exceeds the specified time interval, the program(s) is/are caused to executed, such as by a user manually causing execution, the monitored elapse of time is reset and the system continues to monitor the elapse of time.

Further, a determination as to whether or not the condition(s) is/are satisfied is made (block 208). In one embodiment, this determination is made after the monitored elapse of time equals or exceeds the specified time interval and the condition(s) must be satisfied at this time. In an alternate embodiment, the condition(s) is/are monitored continually and can be satisfied at any time, even if the condition(s) is/are subsequently not satisfied when the elapse of time equals or exceeds the specified time interval.

Once the elapse of time equals or exceeds the specified time interval and the condition(s) is/are determined to be satisfied, the execution of the subsequent incident of the program(s) is/are caused (block 210). In one embodiment, the monitored elapse of time is then reset and the monitoring of the elapse of time and the determination as to satisfaction of the condition(s) are repeated for the next recurrence of the program(s) execution.

Figure 1:
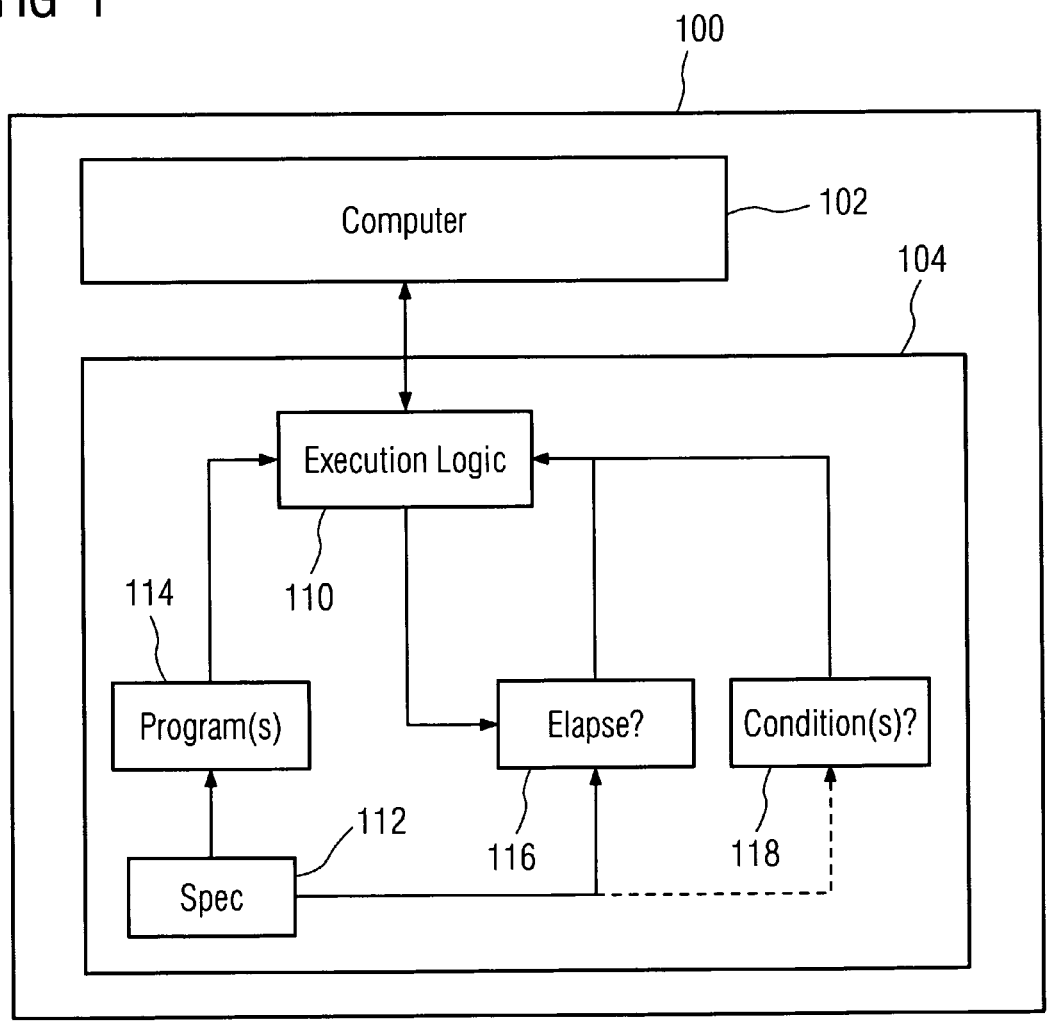
FIG. 1 depicts block diagram of an exemplary task management system according to one embodiment.

FIG. 1 depicts block diagram of the logical implementation of an exemplary task management system 104 according to one embodiment. As described above, the system 104 may be executing on the computer 102 that will execute the particular program 114 or may executing on a computer remote therefrom. In one embodiment, the system 104 is implemented as one or more software programs executing in the memory of the computer 102. Alternatively, the system 104 may be implemented in hardware or a combination of hardware and software.

The system 104 includes a specification 112 of the program(s) to be executed 114 and a time interval. The specification 112 may be implemented as a memory or other storage device which stores data representing the specification of the program(s) and the time interval. The specification 112 may be received from a remote computer and/or from a user via a user interface (not shown). The program(s) to be executed 114 may be provided with the specification 112 or the specification 112 may simply specify the program's location and instructions for executing it.

The system 104 further includes execution logic 110, elapse logic 116 and condition test logic 118. The execution logic 110 is coupled with the program(s) 114 and computer 102 and determines when to cause execution of the program(s) 114 on the computer 102 based on the elapse logic 116 and the condition test logic 118. Herein, the phrase "coupled with" is defined to mean directly connected to or indirectly connected through one or more intermediate components. Such intermediate components may include both hardware and software based components. The elapse logic 116 may include, or be coupled with, a counter, clock device or other timing device and measures the elapse of time from a given event and compares the elapse of time with the specified time interval. The elapse logic 116 may be further coupled with the execution logic 110 so that the execution logic 110 can reset the elapse count/time upon execution of the program 114. The elapse logic 116 further compares the elapsed time with the specified time interval and, upon the elapsed time equaling or exceeding the specified time interval, the elapse logic 116 signals the execution logic 110 that the time interval has elapsed. The condition test logic 118 determines whether the condition(s), inherent or specified by the specification 112, has been met. As was discussed above, wherein the condition(s) is/are inherent in the operation of the system 104, there may actually be no condition test logic 118 as operation of the system 104 may indicate, itself, that the inherent condition has been satisfied. Where the condition(s) is/are independent and testable, the condition test logic 118 determines whether the condition(s) is/are satisfied. In one embodiment, the condition test logic 118 determines if the condition(s) has/have been satisfied only after the elapse logic 116 has determined that the time interval has elapsed since the prior execution of the program 114 and the condition(s) must be satisfied at this time. In an alternate embodiment, the condition(s) may be met prior to elapse of the time interval, though it/they may not be satisfied when the time interval has elapsed. Upon satisfaction of the condition(s), the condition test logic 118 sends a signal to the execution logic 110 indicating as such.

The execution logic 110, upon receiving signals indicating that the time interval has elapsed and the condition(s) is/are satisfied, causes the program(s) 114 to be executed on the computer 102. In one embodiment, the execution logic 110 then resets the elapse time/counter, either after the program(s) 114 finishes executing or after the program(s) 114 starts executing, depending upon the implementation, in preparation of the next recurrence of the program(s) 114 execution.

In this way, the program(s) 114 is/are executed at the specified interval and according to the specified or inherent conditions thereon. This avoids "catch-up" situations where missed executions of the program 114 are executed all at once when the condition(s) is/are satisfied and also prevents delays in execution when the system availability or satisfaction of other conditions are not aligned with the execution schedule.

In an exemplary system 104, an asset management program 114 is to be executed on a computer 102 every 14 days (time interval) and the computer must be operational for the program 114 to execute. On day 1 the computer 102 is started and the asset management program 114 is executed. For the next 14 days, the computer 102 is used regularly but the asset management program 114 is not caused to execute by the system 104. On day 15, the computer 102 is started. At this time, the elapse logic 116 determines that the time interval has elapsed and the condition test logic 118 determines that the computer 102 is operational. The execution logic 110 then causes execution of the program 114 and then resets the elapse logic 116. If the computer is restarted that same day, the execution logic 110 will not cause the program 114 to be executed again. 14 days later, the computer 102 is not started and is not again started for another 20 days. At this time, the computer 102 is started, and as described above, the execution logic 110 causes the program 114 to be executed only once despite the fact that two intervals have passed.

It will be appreciated that the task/program to be executed may be executed on a first computer so as to perform a task with respect to a second computer, such as over a network. Accordingly, execution of the task/program may be dependent upon the condition that both the first computer and second computer be available.

It is therefore intended that the foregoing detailed description be regarded as illustrative rather than limiting, and that it be understood that it is the following claims, including all equivalents, that are intended to define the spirit and scope of this invention.

I claim:

1. A method of causing execution of at least one program on a computer by a management computer, the method comprising:
   receiving, by the management computer, a specification of a time interval and the at least one program to be executed, the execution of the at least one program being related to satisfaction of at least one condition which is unrelated to the time interval;
   initially causing, by the management computer, execution of an incident of the at least one program by the computer in response to the receiving and begin monitoring for expiration of the specified time interval based thereon;
   determining, by the management computer, that execution of the incident of the at least one program has at least been caused, so as to avoid subsequently causing execution of another incident of the at least one program prior thereto, and, once it has been determined that execution of the incident of the at least one program has at least been caused and the specified time interval has not expired, continuing to monitor for expiration of the specified time interval;
   determining, by the management computer upon expiration of the specified time interval, whether the at least one condition is satisfied;
   causing, by the management computer, execution of a subsequent incident of the at least one program when the specified time interval has expired and the at least one condition is satisfied and resetting the monitoring for the expiration of the specified time interval; and
   waiting, by the management computer if the specified time interval has expired and the at least one condition is not satisfied, for the condition to be satisfied, and upon satisfaction thereof causing, by the management computer, execution of a subsequent incident of the at least one program and resetting the monitoring for the expiration of the specified time interval.

2. The method of claim 1, wherein the causing execution of the subsequent incident of the at least one program further comprises determining that execution of the subsequent incident of the at least one program has at least been caused so as to avoid subsequently causing execution of another incident of the at least one program prior thereto, and, once it has been determined that execution of the subsequent incident of the at least one program has at least been caused, monitoring again for the expiration of the specified time interval, determining whether the at least one condition is satisfied and causing execution of another subsequent incident of the at least one program when the specified time interval has again expired and the at least one condition is again satisfied.

3. The method of claim 1, wherein the causing execution of the incident of the at least one program further comprises:
   monitoring, by the management computer, for a second expiration of the specified time interval;
   determining, by the management computer upon expiration of the specified time interval, whether the at least one condition is satisfied; and
   causing, by the management computer, execution of the incident of the at least one program when the specified time interval has expired and the at least one condition is satisfied.

4. The method of claim 1, wherein the causing execution of the incident of the at least one program further comprises transmitting a command to the computer over a network to cause the computer to execute the incident of the at least one program and the causing execution of the subsequent incident of the at least one program further comprises transmitting a command to the computer over the network to cause the computer to execute the subsequent incident of the at least one program.

5. The method of claim 1, wherein the at least one condition comprises the computer being operational.

6. The method of claim 1, wherein the at least one condition comprises that the computer is not busy.

7. The method of claim 1, wherein the at least one condition comprises an occurrence of an event.

8. The method of claim 1, wherein the at least one condition is at most indirectly related to the time interval.

9. The method of claim 1, wherein the at least one condition is dynamically changeable.

10. The method of claim 1, wherein the time interval is dynamically adjustable.

11. The method of claim 1, wherein the at least one condition may never occur.

12. The method of claim 1, wherein the monitoring occurs after the incident of the at least one program finishes executing.

13. The method of claim 1, wherein the determining whether the at least one condition is satisfied occurs after the specified time interval has expired.

14. The method of claim 1, wherein satisfaction of the at least one condition includes satisfaction of the at least one condition prior to the determining whether the at least one condition is satisfied.

15. The method of claim 1, wherein execution of a subsequent incident of the at least one program prior to the expiration of the specified time interval restarts the specified time interval.

16. A management system for causing execution of at least one program on a computer, the management system comprising a processor and a memory coupled with the processor, the management system further comprising:
    first logic, stored in the memory and executable by the processor to cause the management system to receive a specification of a time interval and the at least one program to be executed, the execution being related to satisfaction of at least one condition which is unrelated to the time interval;
    second logic stored in the memory and coupled with the first logic and the computer and executable by the processor to cause the management system to initially cause execution of an incident of the at least one program by the computer in response to the receiving and begin to monitor for expiration of the specified time interval based thereon;
    third logic stored in the memory and coupled with the second logic and executable by the processor to cause the management system to determine that execution of the incident of the at least one program has at least been caused so as to avoid subsequently causing execution of another incident of the at least one program prior thereto, and, once it has been determined that execution of the incident of the at least one program has at least been caused and the specified time interval has not expired, continue to monitor for expiration of the specified time interval;
    fourth logic stored in the memory and coupled with the first logic and executable by the processor to, upon expiration of the specified time interval, cause the management system to determine whether the at least one condition is satisfied;
    fifth logic stored in the memory and coupled with the first, third and fourth logic and the computer and executable by the processor to cause the management system to cause execution of a subsequent incident of the at least one program when the specified time interval has expired and the at least one condition is satisfied and reset the monitoring for the expiration of the specified time interval; and
    sixth logic stored in the memory and coupled with the first, third and fourth logic and the computer and executable by the processor to cause the management system to wait, if the specified time interval has expired and the at least one condition is not satisfied, for the condition to be satisfied, and upon satisfaction thereof cause execution of a subsequent incident of the at least one program and reset the monitoring for the expiration of the specified time interval.

17. The management system of claim 16, wherein the fifth logic is further operative to cause the management system to restart the specified time interval when the specified time interval has expired and the at least one condition is satisfied.

18. The management system of claim 16, wherein the second logic is further operative to cause the management system to monitor an elapse of time since the specification was received, compare the elapse of time with the specified interval, determine whether the at least one condition is satisfied and cause execution of the incident of the at least one program when the elapse of time equals or exceeds the specified time interval and the at least one condition is satisfied.

19. The management system of claim 16, wherein the second logic is further operative to cause the management system to transmit a command to the computer over a network to cause the computer to execute the incident of the at least one program and the fifth logic is further operative to cause the management system to transmit a command to the computer over the network to cause the computer to execute the subsequent incident of the at least one program.

20. The management system of claim 16, wherein the at least one condition comprises the computer being operational.

21. The management system of claim 16, wherein the at least one condition comprises that the computer is not busy.

22. The management system of claim 16, wherein the at least one condition comprises an occurrence of an event.

23. The management system of claim 16, wherein the at least one condition is at most indirectly related to the specified time interval.

24. The management system of claim 16, wherein the at least one condition is dynamically changeable.

25. The management system of claim 16, wherein the specified time interval is dynamically adjustable.

26. The management system of claim 16, wherein the at least one condition may never occur.

27. The management system of claim 16, wherein the monitoring occurs after the incident of the at least one program finishes executing.

28. The management system of claim 16, wherein the fourth logic is further operative to cause the management system to determine whether the at least one condition is satisfied after the specified time interval has expired.

29. The management system of claim 28, wherein satisfaction of the at least one condition includes satisfaction of the at least one condition prior to the determining whether the at least one condition is satisfied.

30. The management system of claim 16, further comprising sixth logic coupled with the third logic and operative to cause the management system to restart the specified time interval when the at least one program is executed prior to the expiration of the specified time interval.

31. A management system for causing execution of at least one program on a computer, the management system comprising a processor and a memory coupled with the processor, the management system further comprising:

means for receiving by the processor, a specification of a time interval and the at least one program to be executed, the execution being related to satisfaction of at least one condition which is unrelated to the time interval;

means for initially causing by the processor, execution of an incident of the at least one program by the computer in response to the receiving and begin monitoring for expiration of the specified time interval based thereon;

means for determining by the processor, that execution of the incident of the at least one program has at least been caused so as to avoid subsequently causing execution of another incident of the at least one program prior thereto and, once it has been determined that execution of the incident of the at least one program has at least been caused and the specified time interval has not expired, continuing to monitor for expiration of the specified time interval;

means for determining by the processor, upon expiration of the specified time interval, whether the at least one condition is satisfied;

means for causing by the processor, execution of a subsequent incident of the at least one program when the specified time interval has expired and the at least one condition is satisfied and resetting the monitoring for the expiration of the specified time interval; and means for waiting, by the processor if the specified time interval has expired and the at least one condition is not satisfied, for the condition to be satisfied, and upon satisfaction thereof causing, by the processor, execution of a subsequent incident of the at least one program and resetting the monitoring for the expiration of the specified time interval.

* * * * *